US005343287A

United States Patent [19]

Wilkins

[11] Patent Number: 5,343,287
[45] Date of Patent: Aug. 30, 1994

[54] INTEGRATED ATMOSPHERIC TRANSVERSE COHERENCE LENGTH/LASER RADIATION ANGLE-OF-ARRIVAL MEASUREMENT SYSTEM

[75] Inventor: Gary D. Wilkins, New Carlisle, Ohio

[73] Assignee: The United States of America as represented by the Secretary of the Air Force, Washington, D.C.

[21] Appl. No.: 43,115

[22] Filed: Apr. 5, 1993

[51] Int. Cl.$^5$ .................. G01B 11/26; G01C 1/00
[52] U.S. Cl. .................. 356/141.3; 250/201.9; 356/123; 359/126; 359/159
[58] Field of Search ............ 356/141, 124, 123, 141.3; 358/107; 250/203.9; 359/126, 159

[56] References Cited

U.S. PATENT DOCUMENTS

| H412 | 1/1988 | Miller, Jr. et al. ............ 250/203 R |
|---|---|---|
| 4,498,768 | 2/1985 | Holl .................................. 356/141 |
| 4,824,245 | 4/1989 | Gardner et al. .................. 356/141 |
| 4,880,305 | 11/1989 | Salt .................................... 356/141 |
| 5,103,452 | 4/1992 | London et al. ..................... 372/5 |
| 5,113,423 | 5/1992 | Csonka ............................. 378/145 |

OTHER PUBLICATIONS

Gary D. Wilkins, Measurement of the Atmospheric Phase Coherence Length, ʳo Dec. 1986, p. 31.
Gary D. Wilkins, The Diffraction Limited Aperture of the Atmosphere and its Effects on Free Space Laser Communications, IEEE 1992 National Aerospace and Electronics Conference Naecon 1992, May 1992, vol. 3, pp. 1158–1163.
Gary D. Wilkins, Atmospheric Transverse Coherence Length Measurements System for Laser Communications, Feb. 93, pp. 1–48.

Primary Examiner—Stephen C. Buczinski
Attorney, Agent, or Firm—Bernard E. Franz; Thomas L. Kundert

[57] ABSTRACT

The System is a test instrument used to measure the quality of the optical path through the atmosphere. The device measures the atmospheric transverse coherence length, also known as Fried's parameter or the diffraction limited aperture of the atmosphere, and the angle-of-arrival of incident optical radiation. The system consists of a high resolution Charge Coupled Device (CCD) camera mounted at the focal plane of a telescope and interfaced with a high resolution frame grabber and computer. Incident optical radiation is focused by the telescope onto the CCD array in the camera. The picture frame is then transferred to the frame grabber where the computer determines the size of the focussed spot and position of the spot in pixel coordinates, the Atmospheric Transverse Coherence Length and the Angle-of-Arrival. The software required to control the camera and determine the parameters is an integral part of the system.

1 Claim, 3 Drawing Sheets

INTEGRATED ATMOSPHERIC TRANSVERSE COHERENCE LENGTH/LASER RADIATION ANGLE-OF-ARRIVAL MEASUREMENT SYSTEM

RIGHTS OF THE GOVERNMENT

The invention described herein may be manufactured and used by or for the Government of the U.S. for all governmental purposes without the payment of any royalty.

BACKGROUND OF THE INVENTION

The present invention relates generally to an integrated atmospheric transverse coherence length/laser radiation angle-of-arrival measurement system, to record the quality of the atmospheric channel during testing of free space laser communications systems. The laser radiation angle-of-arrival measurements aid in the optical system alignment of the system as well as serve as a record of atmospheric turbulence and platform induced angle-of-arrival changes of the laser communications signal.

One of the most important items to consider when using free space laser communications in an atmospheric environment is the atmosphere. Whether communication is from air-to-air or air-to-ground, the atmosphere plays a major role in corrupting it. Moisture, aerosols, temperature and pressure changes produce refractive index variations in the air by causing random variations in density. These variations, depicted in FIG. 1, are referred to as eddies and have a lens effect on light passing through them. When a plane wave passes through these eddies, parts of it are refracted randomly causing a distorted wavefront with the combined effects of variation of intensity across the wavefront and warping of the isophase surface. By the time the light reaches its destination, it is no longer spatially or temporally coherent over the entire wavefront, and an optical system sampling a large portion of the wavefront would not be able to focus the light to the diffraction limit of the optics. Instead, the size of the airy disk produced would be a function of the diffraction limited aperture of the atmosphere, or Atmospheric Transverse coherence length, $r_o$, as it is sometimes called. An optical system which has an aperture equal to or less than the $r_o$ will sample a coherent portion of the wave and produce an image that is based upon the quality of the optical equipment. If the aperture of the optical equipment is larger than the $r_o$, then the quality of the image will be dependent upon the amount of atmospheric turbulence in the optical path.

An airy disk is defined as the bright spot in the system of diffraction rings formed by an optical system with light from a point's source (as a star).

One of the earliest methods of determining $r_o$ involved photography. Light from a distant star was focused onto a photographic plate and after a suitable exposure time the plate was developed. The diameter of the focused spot was then determined with the aid of a densitometer and a mechanical measuring device. The $r_o$ was then calculated in accordance with diffraction theory and the following equations which relate the telescope aperture, D, the wavelength of light, $\lambda$, and the focal length of the optical system, f.l., to the size of the focused spot, airy disk diameter:

$$AiryDiskDiameter = 2.44(\lambda * f.l.)/D$$

Knowing that using an optical system with an aperture greater than the $r_o$ will produce a focused spot size which is dependent upon the diffraction limited aperture of the atmosphere allows us to replace the telescope aperture, D, in the diffraction equation with $r_o$ to arrive at a relationship between the Airy Disk Diameter and $r_o$:

$$r_o = \frac{2.44(\lambda * f.l.)}{(AiryDiskDiameter)}$$

Even though one could conceivably use an automatic camera to take a sequence of pictures over a period of time, it would be a rather slow process and in no way could it be considered close to a real-time measurement. As interest in the stochastic nature of the atmosphere grew and technology advanced, other methods of measuring the "seeing condition" of the atmosphere were developed.

A past endeavor of mine involved developing a method of measuring the $r_o$ for use as a tool to help characterize the atmosphere for surveillance applications. I used a 1-meter aperture cassegrain telescope, shown in FIG. 2, to gather incoming light from a point source and focus it onto a spinning reticle wheel which contained a track of apertures which increased geometrically in size (ref. Wilkins, Technical Report RADC-TR-86-192, titled "Measurement of the Atmospheric Phase Coherence Length, $r_o$" Rome Air Development Center, Air Force Systems Command, Griffis Air Force Base, N.Y. 13441-5700, 1986). Light passing through the apertures of the reticle was collected by a photomultiplier tube and the resulting electrical signal was digitized by an analog-to-digital converter. The digital output contained information about the modulation transfer function of the atmosphere and was reduced by computer to provide the diffraction limited aperture of the atmosphere. The system was large, even without the 1-meter telescope, and the optics were difficult to keep aligned due to atmospheric turbulence induced beam wander. Although the system was good for its time, its size and mechanical parts were impractical for use as a real time atmospheric turbulence monitor for laser communications systems.

Other methods of obtaining the $r_o$ have also been employed. One such method is to measure the refractive index structure parameter, $C_n^2$, using a stellar scintillometer. This method involves taking several scintillation measurements along the optical path and deriving the $C_n^2$ information analytically. The $r_o$ can then be obtained by using an equation which relates $r_o$ to $C_n^2$. Although this method does arrive at the $r_o$, it was not considered acceptable for our laser communications work because it is time intensive. Ostensibly, atmospheric conditions change due to wind, temperature and pressure changes. Consequently, the atmospheric refractive index structure parameter and thus the diffraction limited aperture of the atmosphere also undergo constant change. Since, using the $C_n^2$ method requires several scintillation measurements and analytical computations for each $r_o$ measurement, it is not possible to derive the $r_o$ fast enough to make the required communications parameter changes to allow for an optimum communication channel. The following United States patents and SIR, relating to angle-of-arrival sensors, are of interest.

4,880,305—Salt 4,824,245—Gardner et al
H 412—Miller, Jr et al
4,498,768—Holl

The Salt patent describes a detector for use in determining the orientation of a laser beam. The detector comprises a fiber optic bundle with a polished input end disposed at a known orientation and an output end, and a sensor adjacent the output end of the bundle. In operation, the sensor measures the diameter of a light output from the fiber optic bundle at a predetermined plane perpendicular to the longitudinal axis of the fiber optic bundle. The diameter varies as a function of the angle of the incidence of the laser beam on the input end.

The Gardner et al patent describes a response ratioing angle of arrival sensor. The invention includes a sensor assembly having two detectors per plane of measurement, and means for dividing the incident electromagnetic radiation into first and second components. The components have intensities determined by angle of arrival of the incident radiation. The first and second detectors are respectively responsive to the first and second radiation components, and provide outputs which are indicative of the angle of arrival of the incident electromagnetic radiation.

The Miller, Jr et al SIR is directed to a device which when illuminated by optical radiation will determine the direction from which the radiation originated. The device comprises a linear detector array and an opaque mask having a narrow slot. The array is positioned a fixed distance behind the opaque mask, and oriented perpendicular to the slot. Light from the laser source, limited by the mask and slot, falls on only a few adjacent elements of the detector array, depending on the direction of arrival of the light.

The Holl patent describes an apparatus for measuring the horizontal and vertical aspect angles of radiation received from a remote laser transmitter. The apparatus comprises a triangular cube corner reflector with built-in linear arrays, and an electronic processor. The detectors are linear arrays along the three edges of the entrance aperture. In operation, the processor receives signals indicating the number and location of the detectors which have been illuminated by the incoming radiation, and determines the horizontal and vertical aspect angles of the radiation.

SUMMARY OF THE INVENTION

An objective of the invention is to provide a system to record the quality of the atmospheric channel during testing of free space laser communications systems.

More specifically, an objective was to determine the feasibility of using inherent information obtained through the measurement of the diffraction limited aperture of the atmosphere ($r_o$) to adapt laser communications system parameters to provide an optimum communication channel in the presence of atmospheric turbulence.

The invention relates to a test instrument used to measure the quality of the optical path through the atmosphere. The device measures the atmospheric transverse coherence length, also known as Fried's parameter or the diffraction limited aperture of the atmosphere, and the angle-of-arrival of incident optical radiation. The system consists of a high resolution Charge Coupled Device (CCD) camera mounted at the focal plane of a telescope and interfaced with a high resolution frame grabber and computer. Incident optical radiation is focused by the telescope onto the CCD array in the camera. The picture frame is then transferred to the frame grabber where the computer determines the size of the focussed spot and position of the spot in pixel coordinates, the Atmospheric Transverse Coherence Length and the Angle-of-Arrival. The software required to control the camera and determine the parameters is an integral part of the system.

The laser radiation angle-of-arrival measurements aid in the optical system alignment of the system as well as serve as a record of atmospheric turbulence and platform induced angle-of-arrival changes of the laser communications signal.

DETAILED DESCRIPTION

The invention is described in a technical report WL-TR-93-1023, by Gary D. Wilkins, entitled "Atmospheric Transverse Coherence Length Measurements for Laser Communications", Avionics Directorate, Wright Laboratory, Air Force Materiel Command, Wright-Patterson Air Force Base Ohio 45433-7409, with a nominal date of February 1993; and in a paper by Gary D. Wilkins entitled "The Diffraction Limited Aperture of the Atmosphere and its Effects on Free Space Laser Communications" published at pages 1158–1163 in Vol. 3 of Proceedings of The IEEE 1992 National Aerospace and Electronics Conference (NAECON) 1992, held at the Dayton Convention Center May 18–22, 1992. Both the paper and the technical report are included with this application as filed, and are hereby incorporated by reference.

BER is Bit Error Rate.

BERT is Bit Error Rate Tester.

Since optical communications relies on the use of wavelengths which are highly influenced by changes in refractive index, the direct relationship between atmospheric turbulence and communications quality was investigated. The reason for doing this was to see if enough information could be gathered by repeated sampling of the $r_o$ to allow changes to be made in the communications parameters which would optimize the communications and guarantee maximum information through put.

Figure 1:
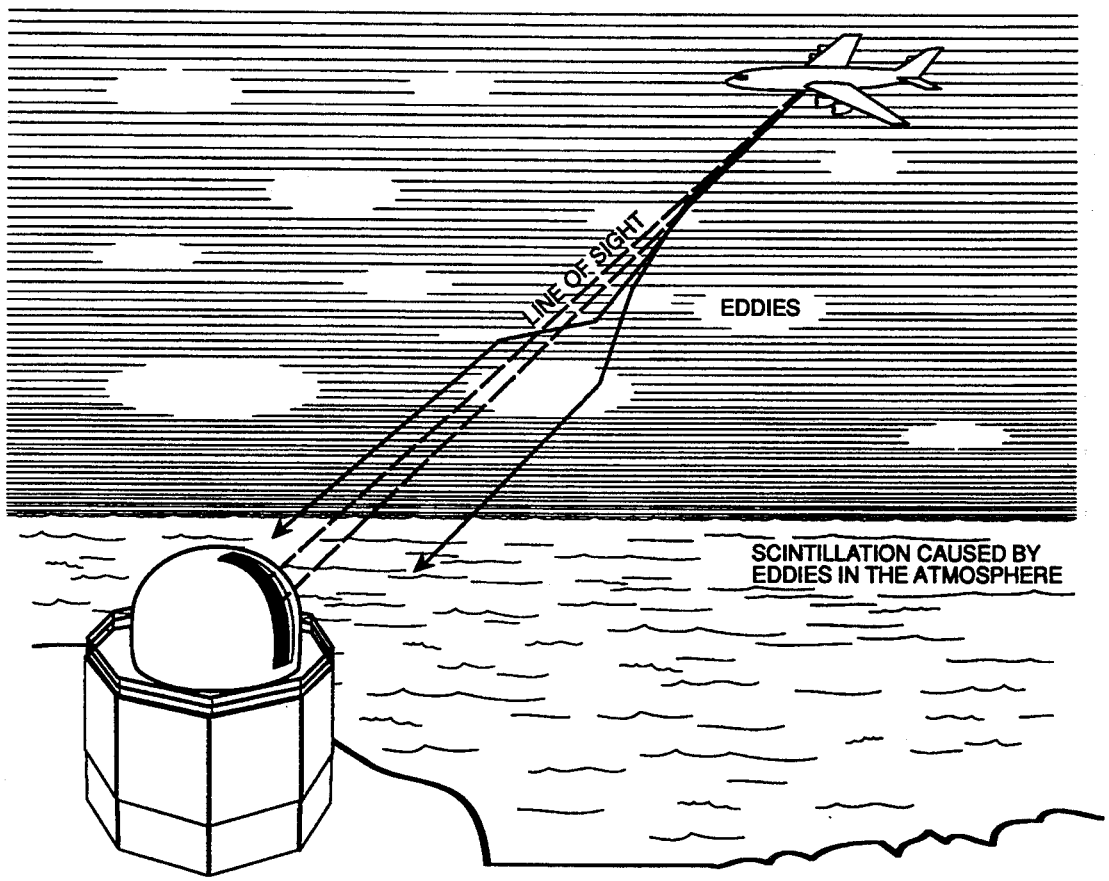
FIG. 1 is a diagram of an atmospheric turbulence profile showing scintillation caused by eddies in the atmosphere.
Figure 2:
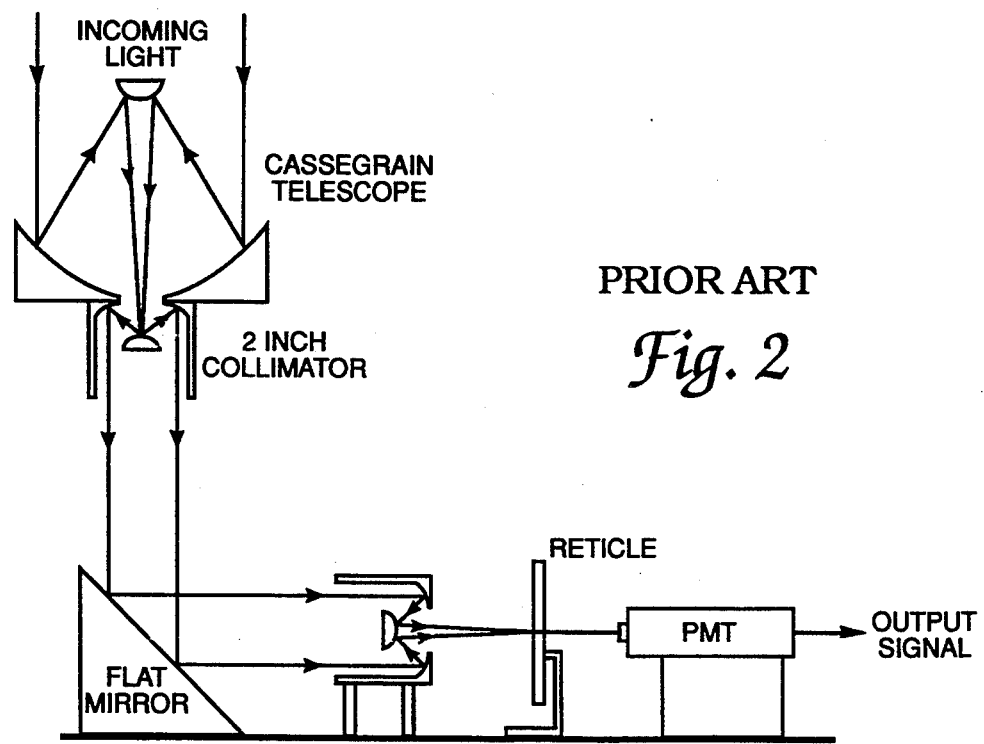
FIG. 2 is a diagram of a rotating reticle wheel method of measuring $r_o$.
Figure 3:
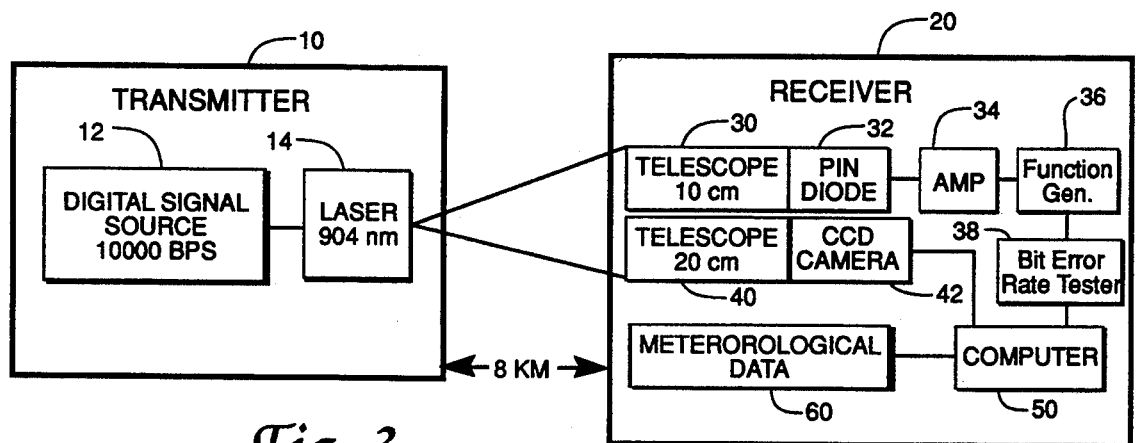
FIG. 3 is a block diagram of a free space laser communications link.

As shown in the block diagram of FIG. 3, a laser communications link over a 5-mile path was used for measuring the Bit Error Rate (BER) of the digital signal, and measuring the $r_o$ of the path. The laser communications system for an 8-kilometer free-space link, comprises a laser transmitter 10, a receiver 20, and the required interfaces and the $r_o$ measuring equipment in the laboratory with available off-the-shelf components and equipment.

The 8-kilometer pulsed laser communications link has been established between a remote test site and a Laser Communications Lab (LCL) on the twelfth floor of a tower. The laser transmitter 10 which comprises digital signal source 12 and a 904-nm laser 14 are located at the remote site. The digital signal source 12 which operates at 10,000 BPS, includes a Bit Error Rate encoder. The receiver 20, with $r_o$, meteorological, and data acquisition equipment, are located in the LCL. Since $r_o$ measuring equipment and laser receivers are not available off the shelf, they were designed and built in-house.

Atmospheric Transverse Coherence Length Measurement System

Figure 4:
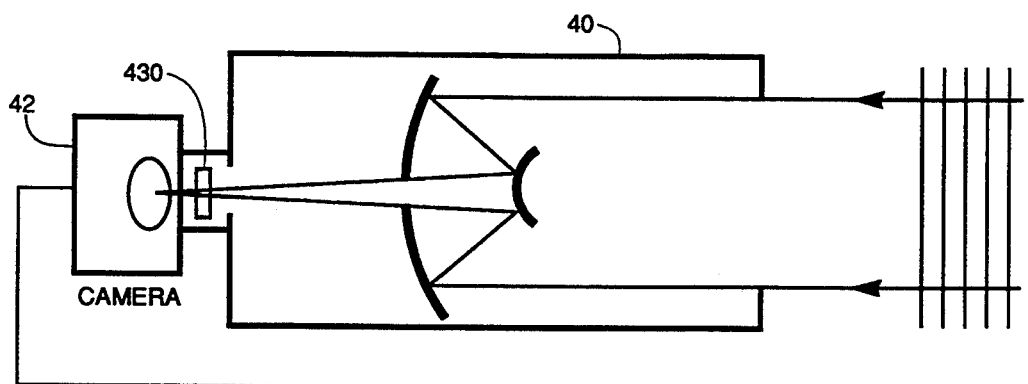
FIG. 4 is a diagram of an $r_o$ measuring system.
Figure 4:
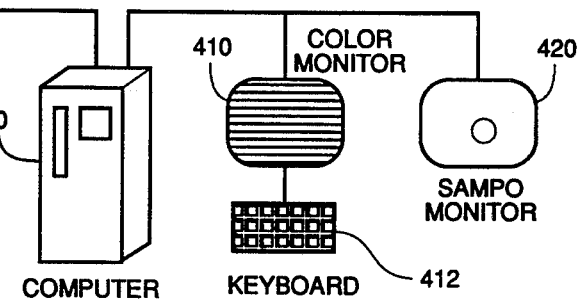

The LCL houses the equipment used for measuring the $r_o$. An in-house designed and built system, the device incorporates the simplicity of the photographic method with the data acquisition capability of the rotating reticle wheel method, without the need for chemicals or mechanical devices. The system consists of a Celestron 20 cm aperture telescope 40 which focuses the light from the laser onto a CCD array of a camera 42. The hardware platform for the system includes the items shown in FIG. 4. The telescope 40 is a Celestron Classic 8 Schmidt Cassegrain Telescope. The camera 42 is a VIDEK MEGAPLUS 1024 by 1024 CCD array camera. A Digital Equipment Corporation VAXstation II/GPX computer 50 includes a) a Dual RX50 floppy disk drive, b) a TK50 tape drive, c) a RD54 159 megabyte hard disk drive, d) a RD53 71 megabyte hard disk drive, and e) a Univision Digitizer/Display Controller (UDC-500Q) with an Intel 82786 graphics coprocessor. The items in FIG. 4 also include a VR290 color monitor 410 with a LK201 keyboard 412, a Sampo high resolution, 19-inch monochrome monitor 420, and a 904-nm center wavelength, 10-nm bandpass interference filter 430.

The image of the Fourier transform of the incoming laser light captured by the round aperture telescope 40, and CCD camera 42 is digitized by a Univision UDC500Q frame grabber residing inside the MicroVAX computer 50. Horizontal and vertical sync pulses are delivered to the camera and digital video is delivered to the UDC-500Q controller via a 37-pin D connector mounted on the UDC-500Q. Images are displayed on the high resolution Sampo monitor 420 connected directly to the UDC-500Q video output connector.

Some computer code required by the frame grabber to digitize the camera output and display the image was supplied by Univision as part of the UDC500 demonstration package, the only one required to operate the camera being UDC500VAXUTI.EXE. Upon execution of the program, the input required from the user is:

| COMMAND | DESCRIPTION |
| --- | --- |
| C 2 | CAMERA TYPE SELECTION (VIDEK) |
| T 12 | INITIALIZE 82786 BIU & DP REGISTERS |
| T 18 | GRAB THE IMAGE |
| T 17 | SNAP AN IMAGE |

Command T 18 places the UDC500 in a continuous frame grabbing mode with the frame rate being dependent upon the shutter delay and exposure settings on the rear of the VIDEK camera 42. The image output is displayed on the Sampo high resolution (1024 by 1024) monitor 420. Executing command T 17 then freezes the image for further processing such as determining object size and position on the screen.

The Videk camera 42 and UDC500Q display controller were purchased as a set, complete with demonstration software, from Univision Inc. The software, UDC500Q, and VIDEK camera displayed the images beautifully on the high resolution (1024 by 1024) monitor 420. However, the system had one very serious drawback. It would continuously snap pictures frame after frame without allowing for shutter/exposure control. The camera itself has the following modes of operation which are switch selectable at the rear of the camera:

| MODE | DESCRIPTION |
| --- | --- |
| 0 | Shutter closed, remote control of the mode lines |
| 1 | Shutter locked open, continuous video output |
| 2 | Shutter locked open, triggered internally |
| 3 | Shutter locked open, manually triggered |
| 4,5 | Continuous shutter opening and closing |
| 6 | Shutter and exposure controlled manually |
| 7 | Shutter and exposure controlled by computer |

Modes 5 and 6 cause the camera to continuously snap pictures at the rate of approximately two pictures per second. The length of exposure can be varied from 14 msec to 240 msec using the camera exposure adjustment potentiometer.

Figure 5:
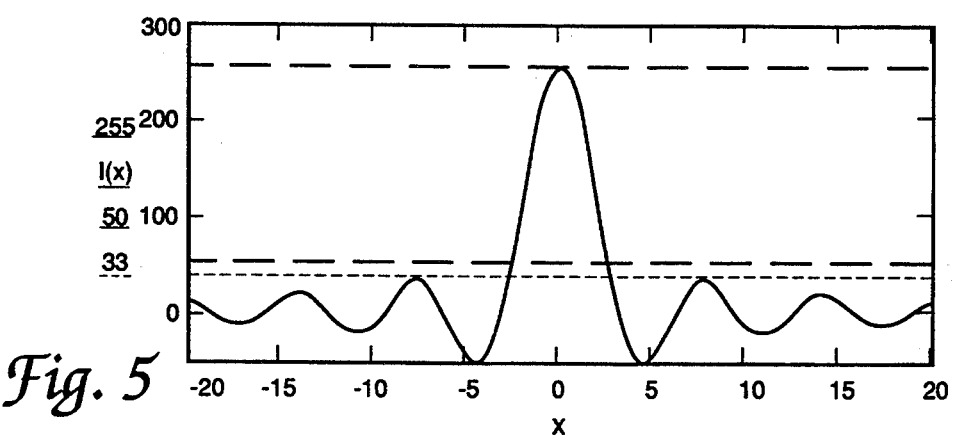
FIG. 5 is a graph showing gray scale normalized airy disk intensity distribution.

To properly estimate the amount of time required for the sample exposure, the software was developed to initially accept a guess from the operator and then either increment or decrement by 10-millisecond steps until an acceptable intensity level was reached. By acceptable intensity level, it is meant that there must be at least 1 pixel, and not more than 100 pixels, on the screen that are white. Since the UDC500Q has the capability of digitizing the image to 256 levels of gray, with 0 corresponding to black and 255 corresponding to white, the computer merely increments until there are enough pixels in the acceptable range of 245 to 255. Increasing the exposure too long can actually turn the whole screen white causing measurement error. This is the reason for putting a limit on the number of white pixels in the acceptable range. Any more than 100 pixels means that the CCD array is severely blooming, or the background light is stronger than the laser energy. In that case, the computer resets the initial time to 100 milliseconds and starts reincrementing in order to get to the acceptable level. Once an acceptable exposure is achieved, the diameter of the airy disk is measured just above the first spurious disk at an intensity level of 50. This is shown in the computer generated gray scale Sinc function graph of FIG. 5.

Communications Equipment

The equipment used for the data communications portion of the project consisted of an off-the-shelf laser transmitter, an in-house built receiver and off-the-shelf pattern generator/error detector equipment for measuring the quality of the communications link.

Transmitter

The laser transmitter 14 in FIG. 3 is a Laser Diode, Inc. LT-201 capable of 100 watts peak optical output power, but was operated at 20 watts peak for this experiment. It operates at a room temperature wavelength of 904 nanometers and a beam divergence of 1 milliradian.

The transmitter is edge triggered by the return to zero TTL output of a bit error rate encoder operating at a clock frequency of 10-kHz and emits a 40-nanosecond pulse for each positive transition of the data input signal. A Hewlett Packard (HP)H965245L Electronic Counter (not shown) slaved to an Arbiter Systems Satellite Controlled Clock provided the 10-kHz synchronized clock. The maximum pulse repetition frequency of the LT-201 has been determined by laboratory experimentation to be 16,800 pulses per second. Technical specifications for the LT-201, as well as other major equipment used for the receiver and $r_o$ measurement system are provided in the Appendix of the Technical Report WL-TR-93-1023.

Receiver

Figure 6:
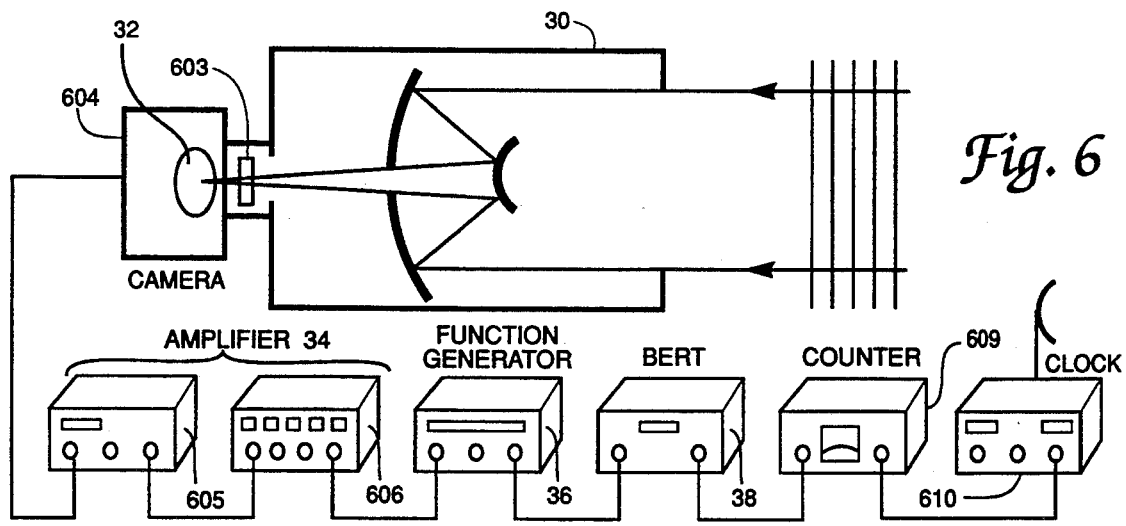
FIG. 6 is a block and symbolic diagram of laser communications link receiver equipment.

The laser receiver as shown in FIG. 6 was designed and built in-house. It consists of Celestron 90 mm Maksutov Cassegrain spotter scope 30, adapted to focus the incoming laser radiation onto a silicon photodiode 32, housed with a 10 nm bandpass filter 603 in a Melles Griot modular photodetection system 604. A Melles Griot 13AMP005 Wide Bandwidth Detector Amplifier 605 supplies current to the detector and acts as the first stage amplifier. The signal is then amplified by a Stanford Research Systems Model SR560 low noise amplifier 606, which supplies the needed gain and electronic filtering (Amplifiers 605 and 606 form amplifier 34 of FIG. 3). The resulting 40-microsecond Gaussian shaped pulses are converted into TTL level square pulses with a Tektronix FG507 function generator 36 and subsequently fed into an HP 3780A Bit Error Rate Tester 38 for analysis. A Hewlett Packard crystal controlled counter 609, slaved to an Arbiter Systems Inc. 1026B Satellite controlled clock 610, provided the 10,000 Hz needed by the BERTs for the synchronous datastream.

Bit Error Rate Testing

Two HP3780A Pattern Generator / Error Detectors were used to measure the quality of the communications link. One HP 3780A was interfaced with the LT-201 laser transmitter at the remote test site and the second HP 3780A was interfaced with the in-house built receiver in the LCL as seen in FIG. 6. Since the LT-201 laser transmitter 14 is edge triggered from the leading edge of a TTL pulse, the interface for the transmitter was fairly straightforward since the data output of the HP 3780A can be configured to provide a Return to Zero, (RZ), TTL data format. One problem which needed to be overcome, however, was that the internal clock rate of the HP 3780A is 10 Mega pulses per second. This greatly exceeds the maximum transmission rate of LT-201 laser transmitter 16.8 Kilo pulses per second. To conquer this situation, the 10-kHz output of an Hp crystal controlled clock was connected to the external clock inputs of the HP 3780A at both the transmitter and receiver ends of the link.

Once the output of the receiver was interfaced with the HP3780A in the LCL, and the system was turned on, it became evident that there were still a few more problems to be solved. Since the clock of the system was now decreased to 0.001 of the internal clock speed of the HP 3780A, it took 1000 times longer to update the BER information on the read-out, or 1 minute and 40 seconds. On calm, nonturbulent days with the diffraction limited aperture of the atmosphere approaching the diameter of the telescope, the BERT would sync almost long enough to provide a reading and then give a SYNC LOSS signal. After a comparison was accomplished on the two external clocks, it was discovered that one clock differed from the other by 1 clock pulse every 1 minute and 30 seconds. From this, it was determined that there was no possible way of conducting the BER test without synchronizing the clocks more thoroughly at each end of the link.

To synchronize the transmitter to the receiver, a different approach was taken. Two Arbiter Systems Inc. 1026B Satellite Controlled Clocks were set up, in the LCL and remote test site, to receive the satellite-disseminated time code from a National Bureau of Standards Geostationary Operational Environmental Satellite (GOES). Since the time code is transmitted once every half-second, the 1-MHz clock output has an accuracy of 1 in $10^7$. This helped tremendously. The transmitter and receiver BERTs synchronized and the BER data collection process started.

Figure 7A:
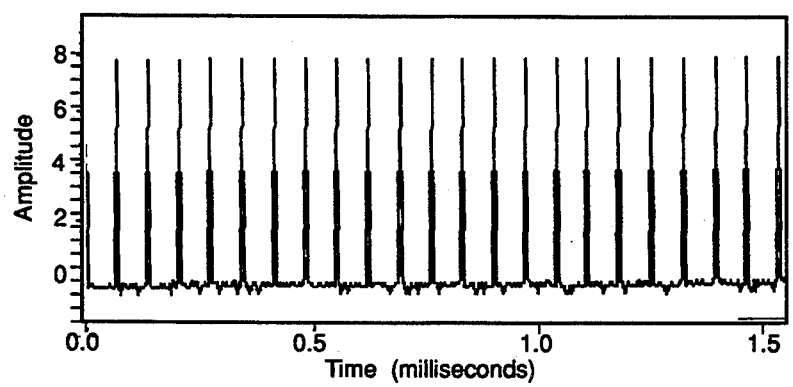
FIG. 7a is a graph showing a Transmitted Laser Communications Signal.
Figure 7B:
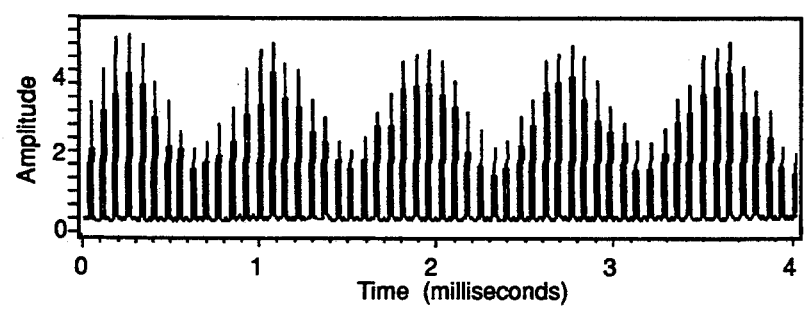
FIG. 7b is a graph showing Received Communications Signal With Scintillation Effects.
Figure 8:
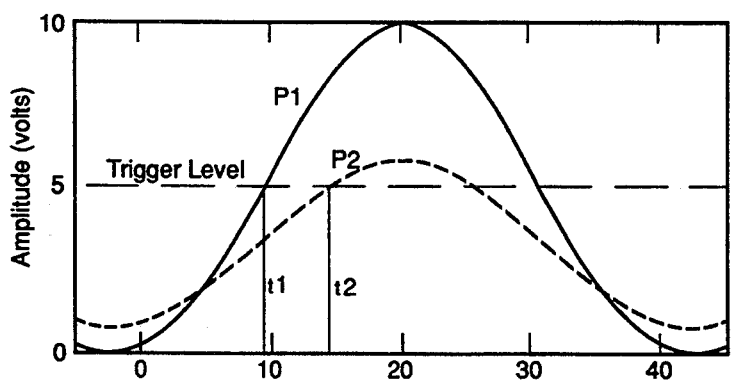
FIG. 8 is a graph showing time variations caused by scintillation induced intensity fluctuations of the laser communications signal.

After all of the equipment induced problems had been solved and the data collection process started, there remained one last challenge, the atmosphere. Scintillation caused by the random movement of the eddies in the atmosphere cause the input signal at the receiver to vary in amplitude from a constant peak amplitude as shown in FIG. 7a to that in FIG. 7b.

The challenge then becomes one of scintillation induced frequency jitter. At the receiver, the received 40-microsecond pulses are converted back into 5-volt TTL compatible pulses by using the function generator 607. After the received signal has been amplified and filtered by the Stanford Research Systems model SR560 Low Noise Preamplifier 606, it is fed into the trigger input of the function generator 36 where the leading edge of the pulse causes the function generator to output one TTL compatible pulse of preset duration for every Gaussian shaped pulse of a certain preset minimum amplitude at the input. Since the amplitude of the input pulses are not constant and have a certain amount of rise and fall time, and the voltage at which the function generator is set to trigger is constant, triggering is accomplished at different relative amplitude levels for each input pulse. For instance, a pulse that has made it through the atmosphere with minimal scintillation effect might appear such as pulse P1 in FIG. 9 and key the transmitter at time t1, or 50 percent of its maximum amplitude. On the other extreme, a pulse that is severely hampered by scintillation may not even trigger the function generator until it has almost reached its maximum amplitude, such as pulse P2, at time t2. The net result is a TTL output with a random time interval between pulses. Since the transmit BERT is synchronized with the receive BERT, the receive BERT expects to see pulses at a certain time with very little variance. If this time interval varies by too much, the receive BERT gets confused as to which pulse it is trying to read, and eventually gives up and dumps its data and starts a new cycle.

Data, Observations, and Conclusions

The technical report WL-TR-93-1023 has sections describing the data collected, observations and conclusions.

SOFTWARE

The final version of the invention is an improvement over the original version in that the software is more user friendly and is adaptable for use with a variety of optics sizes and laser wavelengths. The original software was written for a twenty centimeter diameter telescope and laser wavelength of 904 nanometers. To use the original software with a different laser wavelength or optics aperture size it was necessary to change the source code and recompile. The new software prompts the user for wavelength, optics diameter, and length of exposure. Additional software has been written to assist in the optical alignment of the system by allowing the camera to continually snap and display images without logging data to the hard disk drive. This allows the user to accomplish alignment much faster without filling up the hard disk with useless data. A third algorithm has been developed for the system which allows the user to snap a single picture for a desired exposure length. This gives the user a chance to get a feel for the amount of time required for the exposure requested by the prompt in the main program. It also allows the user to work with, and save, a single image as might be required in surveillance applications.

The program source code listing in the C language follows.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

```
/*
 *
 *   Filename:   TIMER.C
 *
 *   Purpose:    Program to measure the atmospheric transverse coherence length
 *               and angle-of-arrival of incident radiation using a VIDEK
 *               MEGAPLUS CCD array camera, Univision UDC500Q frame grabber,
 *               MicroVAX computer.
 *
 */ include <stdio.h>
include <stdlib.h>
#include <math.h>
#include <string.h>
#include <time.h>
#include <udc500.h>
include <sdsludc.h> define SIZE_OF_ARRAY  1048576
define NUM_INT        SIZE_OF_ARRAY/4
#define NUM_BYTES      1024
#define NUM_PICTURES   2       /* defines no. of pictures taken per cycle*/
#define TIME_INCREMENT 10
define EDGE           150 get_input( int *, int, char [] );

main()
{
struct FB_CNTRL_BLK *fcb;
struct UDC *udc;
short sav;
struct tm *tim;
long expose;
float exposed, r0;
int dummy, tmp = 0;
register int i, j, row, col, cmin, cmax, cdiff, rmin, rmax, rdiff,
         flag1,flag2, aperture_diameter, lamda, focal_length, fIntensity;
union {                        /* storage requirements for 1024x1024 bits */
    unsigned char data[SIZE_OF_ARRAY];
    unsigned char d[ NUM_BYTES ][ NUM_BYTES ];
    unsigned int  idata[ NUM_INT ];
} d1;
char img_filename[16], input[ 10 ], *tstr;
FILE *fptr;
```

```c
/* initialize UDC500 board */
fcb = open_udc();
init_vic( fcb, 2 );
aquire_udc( fcb, 0, 0, 1 );

if( (udc = (struct UDC *)map_udc( fcb, UDC_REG_BASE, UDC_REG_SIZE ) ) == NULL
)
    exit( -1 );   /* error mapping */

/* Set the videk camera to mode 2 ( L-L-H ) ( see p. 2-6 ) */
sav = (short )udc->Control;
sav &= 0x9fff;
udc->Control = sav;

/* Control the shutter register */
sav = sav->iLutAddr;

tim = (struct tm *)malloc( sizeof( struct tm ) );

/* Create filename from the current date */
dummy = time( (time_t * )NULL );
tim = localtime( &dummy );
tstr = (char *)malloc( sizeof( char ) * 26 );

tstr = asctime( tim );
strncpy( img_filename, &tstr[ 4 ], 6 );
img_filename[ 6 ] = '\0';
strncat( img_filename, &tstr[ 19 ], 5 );
img_filename[ 11 ] = '\0';
strcat( img_filename, ".dat" );
img_filename[ 3 ] = '_';
img_filename[ 6 ] = '_';

/* Write the filename into the new file */
if ((fptr = fopen( img_filename , "w" )) == NULL) {
    printf ("Error in opening file!\n");
    exit(1);
    }
fprintf( fptr, "filename == %s\n\n", img_filename );
fprintf( fptr, "Time\t\t  Diameter\tExposure\tRight\tBottom\tR0\n" );
fprintf( fptr, "\t\tWidth\tHeight\t(mSec)\tPixel\tPixel\t(cm)\n\n" );
fclose ( fptr );

/*printf("Enter the focal length of the optics in centimeters:[200]");*/
/* Scanf("%d", &focal_length); */
focal_length=200;

get_input( &aperture_diameter, 20,
            "Enter the optics aperture diameter in centimeters:" );

get_input( &lamda, 904,
            "Enter the Laser Wavelength in nanometers:" );

get_input( &expose, 500,
            "Enter exposure time in milliseconds:" );

flag1 = flag2 = 0;

/* infinite loop to continuously take pictures */
```

```
while( TRUE )
{

/*initialize UDC500 board*/
/*fcb = open_udc();*/
init_vic( fcb, 2 );
aquire_udc( fcb, 0, 0, 1 );

exposed=expose/.11;
    dummy = time( (time_t * )NULL );
    tim = localtime( &dummy );
    /*printf( "sec %d  min %d\n", tim->tm_sec, tim->tm_min );*/
    /*if ( ( tim->tm_sec == 0 ) && ( (tim->tm_min % TIME_INCREMENT) != 0 )
)*/
        {

/* Take pictures and save last (Videk camera needs to "warm up") */
        for( i = 0; i < NUM_PICTURES; i++ ) {

/* Delay between images (Videk needs time to reset internally)
                (delay=.11 milli seconds per cycle) */
            for ( j = 0; j < 27272; j++ )
                sin( 12345.4 );

/* Open shutter */
            sav &= 0x7fff;
            udc->iLutAddr = sav;
            /*printf("shutter open\n");*/

/* Exposure of image (.11 milli second per cycle)*/
            for ( j = 0; j < exposed; j++ )
                sin( 12345.4 );

/* Close shutter */
            sav |= 0x8000;
            udc->iLutAddr = sav;
            /*printf("shutter closed\n");*/
            }

/* Process the picture by counting the pixels */
        if ( read_udc_mem( fcb, 0, SIZE_OF_ARRAY, &dl.data ) != 0 ) {
            /* original data */
            cmin = NUM_BYTES;
            cmax = 0;
            rmin = NUM_BYTES;
            rmax = 0;

for ( row = 50; row < NUM_BYTES; row++ ) {
                for ( col = 50; col < NUM_BYTES; col++ ) {
                    if ( dl.d[ row ][ col ] > EDGE ) {
                        if( cmin > col ) cmin = col;
                        if( cmax < col ) cmax = col;
                        if( rmin > row ) rmin = row;
                        if( rmax < row ) rmax = row;
                        }
                    }
                } cdiff = cmax - cmin + 1;
```

```
        if ( cdiff < 3 ) {
           cdiff = 1;
             printf("Bad data...horizontal diameter not properly measured\n");
           } rdiff = rmax - rmin + 1;
        if ( rdiff < 0 )
           rdiff = 0;
          r0=(2.44*lamda*focal_length)/(cdiff*6800); /* each pixel is 6.8 microns
                                                       square. horizontal diameter
                                                       is equal to cdiff in pixels
                                                       times 6.8 microns per pixel
                                                       times 1000 nm per micron*/
       } if ((fptr = fopen( img_filename , "a" )) == NULL) {
       printf ("Error in opening file!\n");
       exit(1);
       } fprintf( fptr, "%02d:%02d:%02d", tim->tm_hour, tim->tm_min, tim->tm_sec );
    fprintf( fptr, "\t%3d\t%3d\t%4d\t\t%4d\t%5d\t%5f\n",
             cdiff, rdiff, expose, cmax, rmax, r0 );

fclose ( fptr );

if( !( tmp++ % 10 ) ) {
        printf( "\n\nTime\t\t   Diameter\tExposure\tRight\tBottom\tR0\n" );
        printf( "\t\tWidth\tHeight\t(mSec)\t\tPixel\tPixel\t(cm)\n\n" );
        } printf( "%02d:%02d:%02d", tim->tm_hour, tim->tm_min, tim->tm_sec );
    printf( "\t%3d\t%3d\t%4d\t\t%4d\t%5d\t%5f\n",
             cdiff, rdiff, expose, cmax, rmax, r0 );

/* change 9.  Does the image have an intense enough reception */
    fIntensity = FALSE;
    for ( row = rmin; row < rmax, fIntensity = FALSE; row++ )
        for ( col = cmin; col < cmax, fIntensity = FALSE; col++ )
            if ( d1.d[ row ][ col ] > 200 )
                fIntensity = TRUE;

if( fIntensity == TRUE ) {          /* increase the exposure */
        expose += 10;
        printf( "fIntensity == TRUE\n" );
        flag1 = 0;
        } if (cdiff < 100)   /* change 5 */
          {
            if ( cdiff == 0) /* change 7*/
```

```
            {
            flag1++;
            printf("flag1= %d\n", flag1);
            flag2 = 0;
            }
         if ( flag1 == 3)
            {
            expose += 10;
            flag1 = flag2 = 0;
            } if ( cdiff < (rdiff - 10) )
            expose -= 10;
         }
      else
         {
         flag2++;
         if (flag2 ==2)
            expose=200;
         printf("flag2=\n",flag2);
         }
      }
   }
} get_input( int *input, int default_value, char prompt[] )
{
   register int i;
   char tmp[10] = '\0';

*input = default_value;
   printf( "%s [", prompt );
   printf( "%d]", default_value );
   i = 0;
   while( ( tmp[ i ] = getchar() ) != '\n' )
      i++;
   if( tmp[0] != '\n' ) {
      tmp[ i ] = '\0';
      *input = atoi( tmp );
      }
}
```

What is claimed is:

1. A system used to measure the quality of the optical path through the atmosphere, by measuring the atmospheric transverse coherence length (also known as Fried's parameter or the diffraction limited aperture of the atmosphere), and the angle-of-arrival of incident optical radiation, said system comprising a high resolution camera having a charge coupled device (CCD) array mounted at the focal plane of a telescope and interfaced with a high resolution frame grabber and computer, wherein incident optical radiation is focused by the telescope to form a focused spot on the CCD array; means for transferring a picture frame from the camera to tile frame grabber; and means in the computer for determining a size of the focused spot, a position of the spot in pixel coordinates, the atmospheric transverse coherence length, and the angle-of-arrival.

* * * * *

UNITED STATES PATENT AND TRADEMARK OFFICE
CERTIFICATE OF CORRECTION

PATENT NO.   : 5,343,287
DATED        : August 30, 1994
INVENTOR(S)  : Gary D. Wilkins It is certified that error appears in the above-identified patent and that said Letters Patent is hereby corrected as shown below:

Column 18, line 55, "tile" should be --- the ---.

Signed and Sealed this

Eighteenth Day of April, 1995

Attest:

BRUCE LEHMAN

*Attesting Officer*

*Commissioner of Patents and Trademarks*